United States Patent
Seyedi et al.

(10) Patent No.: US 10,795,104 B2
(45) Date of Patent: Oct. 6, 2020

(54) COMB LASER ARRAYS FOR DWDM INTERCONNECTS

(71) Applicant: Hewlett Packard Enterprise Development LP, Houston, TX (US)

(72) Inventors: Mir Ashkan Seyedi, Palo Alto, CA (US); Marco Fiorentino, Mountain View, CA (US); Geza Kurczveil, Santa Barbara, CA (US); Raymond G. Beausoleil, Seattle, WA (US)

(73) Assignee: Hewlett Packard Enterprise Develpment LP, Houston, TX (US)

( * ) Notice: Subject to any disclaimer, the term of this patent is extended or adjusted under 35 U.S.C. 154(b) by 0 days.

(21) Appl. No.: 16/587,873

(22) Filed: Sep. 30, 2019

(65) Prior Publication Data
US 2020/0026011 A1    Jan. 23, 2020

Related U.S. Application Data

(62) Division of application No. 15/953,765, filed on Apr. 16, 2018, now Pat. No. 10,429,601.

(51) Int. Cl.
*G02B 6/43* (2006.01)
*H01S 3/13* (2006.01)
(Continued)

(52) U.S. Cl.
CPC ............. *G02B 6/43* (2013.01); *G02B 6/4286* (2013.01); *H01S 3/131* (2013.01); *H01S 3/1305* (2013.01); *H01S 3/2391* (2013.01)

(58) Field of Classification Search
CPC ...... G02B 6/43; G02B 6/4286; G02B 6/4249; H01S 3/131; H01S 3/2391; H01S 3/1305; H01S 10/506; H01S 10/503
See application file for complete search history.

(56) References Cited

U.S. PATENT DOCUMENTS 6,525,872 B1   2/2003   Ziari
7,113,526 B2   9/2006   Evans et al.
(Continued)

FOREIGN PATENT DOCUMENTS

WO    2017/151416 A2   9/2017

OTHER PUBLICATIONS

Kruschke, B., et al.; "Beam Combining Techniques for High-Power High-Brightness Diode," May-Jun. 2005, <Https://www.ll.mit.edu/news/fan_laserbeamcombining.pdf>.

(Continued)

*Primary Examiner* — Ryan A Lepisto
(74) *Attorney, Agent, or Firm* — Hewlett Packard Enterprise Patent Department

(57) ABSTRACT

A photonic integrated circuit package includes two arrays or sets of integrated comb laser modules that are bonded to a silicon interposer. Each comb laser of an array has a common or overlapping spectral range, with each laser in the array being optically coupled to a local optical bus. The effective spectral range of the lasers in each array are different, or distinct, as to each array. An optical coupler is disposed within the silicon interposer and is optically coupled to each of the local optical buses. An ASIC (application specific integrated circuit) is bonded to the silicon interposer and provides control and operation of the comb laser modules.

10 Claims, 3 Drawing Sheets

(51) Int. Cl.
*G02B 6/42* (2006.01)
*H01S 3/23* (2006.01)
*H04B 10/50* (2013.01)
*H01S 3/131* (2006.01)

(56) References Cited

U.S. PATENT DOCUMENTS

| | | |
|---|---|---|
| 7,535,631 B2 | 5/2009 | Brown |
| 8,750,717 B1 | 6/2014 | Yap |
| 8,855,452 B2 | 10/2014 | Andry et al. |
| 8,982,450 B2 | 3/2015 | Cox |
| 9,088,371 B2 | 7/2015 | Witzens |
| 9,313,562 B2 | 4/2016 | Waldman et al. |
| 9,507,111 B2 | 11/2016 | Collins et al. |
| 9,571,200 B2 | 2/2017 | Saathoff et al. |
| 9,612,401 B2 | 4/2017 | Frankel et al. |
| 9,798,087 B1 | 10/2017 | Sagi et al. |
| 9,876,580 B2 | 1/2018 | Yuan et al. |
| 10,224,628 B2 | 3/2019 | Vidal et al. |
| 2003/0006416 A1 | 1/2003 | Dudoff et al. |
| 2011/0170856 A1* | 7/2011 | Kannari ............... H04B 10/032 398/2 |
| 2012/0177381 A1 | 7/2012 | Dobbelaere et al. |
| 2014/0193115 A1 | 7/2014 | Popovic |
| 2015/0069113 A1 | 3/2015 | Qing et al. |
| 2016/0277115 A1* | 9/2016 | Peterson ............... H04B 10/43 |
| 2017/0151416 A1 | 6/2017 | Kutikov et al. |

OTHER PUBLICATIONS

Bernabé et al., "Chip-to-chip Optical Interconnections between Stacked Self-Aligned SOI Photonic Chips," (Research Paper), Optics Express, vol. 20, No. 7, Mar. 26, 2012, 10 pages.

Extended European Search Report received for EP Patent Application No. 19182992.8, dated Nov. 15, 2019, 8 pages.

Lin, Sen, "Electronic-Photonic Co-Design of Silicon Photonic Interconnects", Technical Report No. UCB/EECS-2017-208, Dec. 13, 2017, 114 pages.

* cited by examiner

COMB LASER ARRAYS FOR DWDM INTERCONNECTS

CROSS-REFERENCE TO RELATED APPLICATIONS

This application is a divisional application of and claims priority to application Ser. No. 15/953,765 filed on Apr. 16, 2018, the contents of which is hereby incorporated by reference in its entirety.

BACKGROUND

Dense Wavelength Division Multiplexing (DWDM) is an optical multiplexing technology allowing transmission of data from different sources onto an optical fiber. DWDM multiplexing allows for about 96 wavelengths, or transmission channels, based on the particular channel spacing. Comb lasers are particularly suited for use with DWDM silicon photonic transmitters, such as a DWDM interconnect device. The comb laser generates a low-noise multi-spectral output of equidistant spectral lines. As the comb-laser has an effective, or limited spectral range, multiple comb lasers of different frequency domains are needed to achieve broad frequency coverage to increase available channels.

The comb-lasers may have an effective life where constant use subjects the comb laser to thermal fluctuations thereby causing the operating characteristics of the laser to change over time. In certain cases, a comb laser may require additional power to produce the same optical power output than when the laser was first used. In other cases, the comb-laser may fail and need replacement. In either situation, components of the DWDM interconnect, or a comb laser itself, must be replaced. Replacement of a component, or the comb laser, typically requires placing the interconnect into an off-line mode thereby disrupting the data transmission through the interconnect device, and manually replacing the defective component.

BRIEF DESCRIPTION OF THE DRAWINGS

The present disclosure is best understood from the following detailed description when read with the accompanying Figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
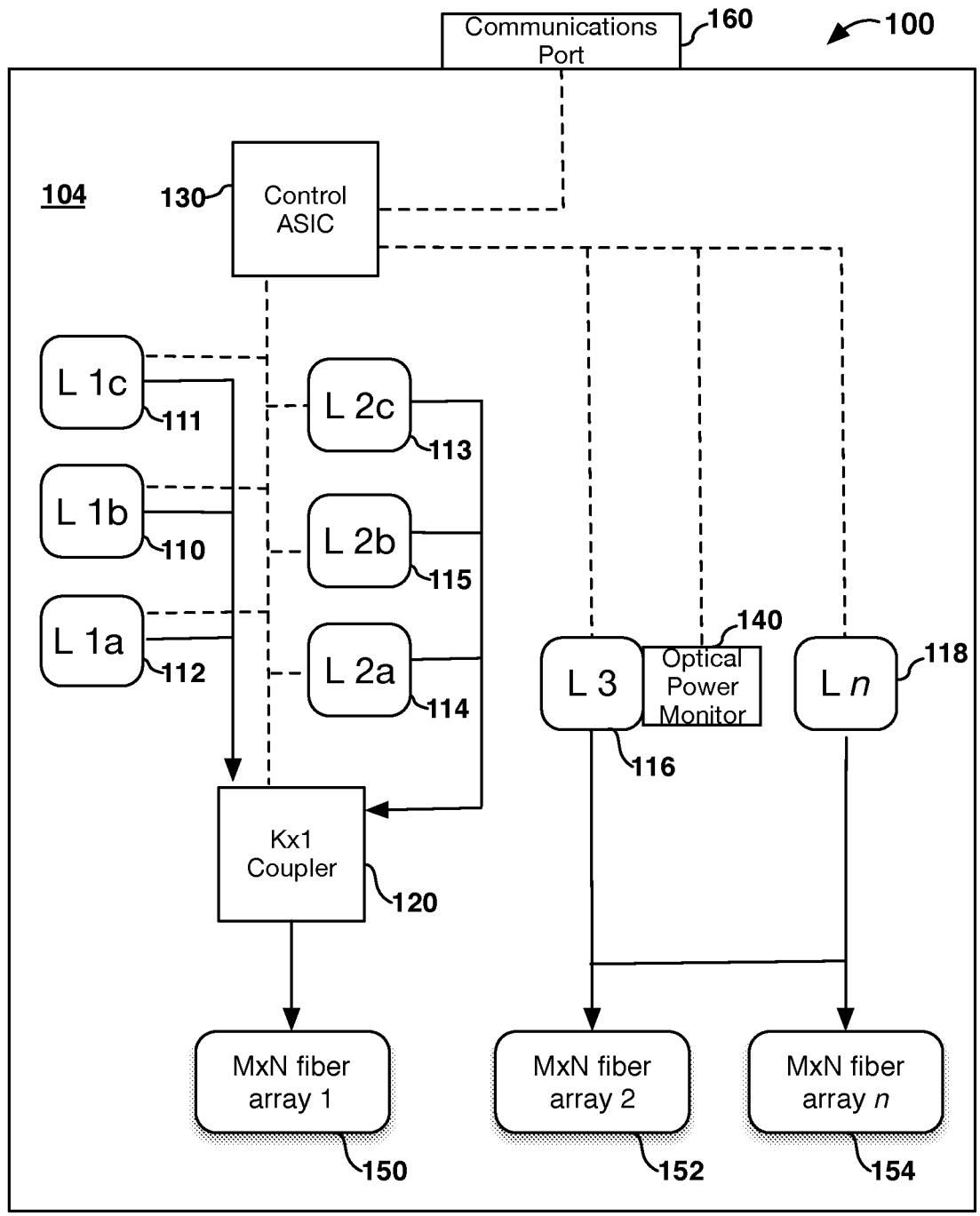
FIG. 1 is a diagram of an exemplary photonic integrated circuit package according to one example of the principles disclosed herein.

Illustrative embodiments of the subject matter claimed below will now be disclosed. In the interest of clarity, not all features of an actual implementation are described in this specification. It will be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

Embodiments of the present disclosure are directed to a photonic integrated circuit package. Two or more arrays or sets of integrated comb laser modules are bonded to a silicon interposer. Each comb laser module of the first array has a common spectral range. The comb laser modules of the first array are each optically coupled to a first optical bus. Each comb laser module of the second array has a common spectral range. The comb laser modules of the second array are each optically coupled to a second optical bus. The spectral range of the comb laser modules of the first array, and the spectral range of the comb laser modules of the second array have different frequency domains. An optical coupler is provided within the silicon interposer. The optical coupler is optically coupled to each of the first and second optical buses. An ASIC (application specific integrated circuit) is bonded to the silicon interposer. The ASIC is electronically coupled individually to each of the comb laser modules in the first and second arrays. The ASIC provides control and operation of the comb laser modules.

Other embodiments of the present disclosure include a system, method and computer readable media controlling multiple arrays of comb laser modules that are disposed on a silicon interposer. The control circuitry of the silicon interposer provides power to a first comb laser module in a first array of comb laser modules. The comb laser modules of the first array have a common spectral output range. The control circuitry of the silicon interposer provides power to a first comb laser module in a second array of comb laser modules. The comb laser modules of the second array have a common spectral output range. The control circuitry determines the occurrence of a switch over event to switch over from one comb laser modules in an array to another comb laser module in the array. Upon determining a switch over event, the control circuitry switches over operation of a primary operative comb laser module to a secondary or backup laser module in the respective array. The switch over event, for example, may be the detection of a failing or failed comb laser module in an array, the detection that the power output of a comb laser module is below a specified threshold level based for a given input voltage, or the receipt of instructions to switch over to a specified comb laser module in the array.

Switching from one comb laser module in an array may be done in a sequential manner where the next comb laser module in an array is utilized when the switch over event occurs. A preferred switch over order may be determined by a diagnostic process performed by the control circuitry where the switch over order for the comb laser modules in an array is determined. The preferred switch over order may be stored in a non-volatile memory register or media store.

Referring now to FIG. 1, the figure depicts a schematic view of a configuration of an exemplary photonic integrated circuit package 100. The photonic integrated circuit package may be constructed as a DWDM interconnect. Solid arrows indicate an optical connection and dashed arrows indicate an electrical connection. The photonic integrated circuit 100 has multiple comb laser modules 110, 111, 112, 113, 114, 115, 116, 118 bonded onto an SiP interposer 104. Each of the comb laser modules are controlled by the control ASIC 130. Each of the comb laser modules are a single laser capable of generating multiple laser lines, typically generating 16 and up to 32 lines, on a single optical output.

Comb laser modules 110, 111, 112 form a laser module array. The laser module array may have n number of laser modules in the array, for example $L_{1a}, L_{1b}, L_{1c}, \ldots L_{1n}$. In an operative state of the photonic integrated circuit package 100, as further described below, the comb laser modules in the array are operated individually, with one of the comb laser modules being powered for operation and data transmission. The non-powered comb laser modules act as a backup to the active comb laser module in the array. In other words, one operative comb laser module in an array provides data transmission, while the other comb laser modules in the array remain unpowered.

This configuration allows use of redundant comb laser modules. In a first array comb laser modules $L_{1b}$ 110 and laser module $L_{1c}$ 111 provide redundancy and serve as back-up comb laser modules for laser $L_{1a}$ 112. While not shown in the figure, each comb laser module has an integrated optical power monitor. The comb laser module's integrated optical power monitor observes the optical output of the laser module. The control ASIC can switch over to the back-up comb laser module in an array should the primary laser module fail. For example, the control ASIC 130 may detect failure or the likelihood of failure of the then current operating laser in the array 112. A redundant laser 110 in the laser array may be initialized and powered to an operative state. A controlled switch over from the failing operative comb laser module to the backup comb laser module may be performed. During the controlled switch over, the ASIC may stop data transmission by the integrated circuit package 100. Power to the failing operative laser module 112 is stopped, and power is provided to the backup comb laser module 110. The control circuitry may run a preliminary diagnostic to evaluate whether the backup comb laser module is operating within a desired power output range. If within a desired power input, and output range, then the control circuitry would begin data transmission again with the backup comb laser module 110. If the first backup comb laser module 110 is determined to be unsuitable, then the next backup laser module 111 in the array would be used.

Switching over from one comb laser module in a particular array to another comb laser module in the same array may be performed in automated manner where the control circuitry performs the switch over when a switch over event is determined, such as detecting a failing of failed comb laser module. Additionally, the control circuitry may receive instructions from a remote source directing the package 104 to switch to another comb laser module. This is especially useful where a separate service may monitor the circuit package 100, and determine or schedule the circuit package 100 to use a different comb laser module.

Each of the comb laser modules have an effective spectral range of emission. Each array covers a separate frequency domain. By coupling the outputs of multiple comb laser modules from different arrays, the circuit package may extend the overall spectral range of emission. As shown, comb laser modules $L_{1a}$ 112 and $L_{2a}$ 114 each produce powered output in two different spectral ranges. When these spectral ranges are combined, the circuit package 100 increases its effective spectral range via optical coupler 120. This makes the two comb laser modules effectively behave as one laser with a greater spectral range. An additional number of n comb laser modules with different frequency domains may be coupled together thereby increase the overall frequency range of the circuit package 100, and the number of possible or usable channels.

The comb laser modules have a spectral range bandwidth of emission of between 7 nm to 11 nm. Combining the spectral bandwidth of two arrays, the circuit package 100 may obtain an effective bandwidth of 14 nm to 22 nm. In one configuration, each of the comb laser modules have about an 8-10 nm spectral bandwidth. To cover transmission over the O-band (1280-1360 nm) with a range of about 100 nm, 10 arrays of comb laser modules may be used. The circuit package 100 would combine each of the comb laser modules output to cover the O-band range. Each array would include two or more comb laser modules in the array. With a configuration of 10 separate arrays and 3 comb laser modules per array, the circuit package 100 would include 30 total comb laser modules coupled to the SiP interposer 104.

Comb laser module 114 and the laser modules in the $L_{1n}$ array 110, 112 are each optically coupled to the optical coupler 120. The optical coupler 120 may be an on-chip optical coupler with n number of optical inputs, with typically one output. The optical coupler 120 is electrically controlled via the control ASIC 130. The control ASIC may be one more CMOS chips that handle logic processing and electrical input/output to control and interface with the comb laser modules 110, 111, 112, 113, 114, 115, 116, 118, the optical coupler 120, the optical power monitor 140 and the communications port 160. The optical coupler 120 is a multi-port Kx1 coupler that provides many optical inputs to one optical output. The control ASIC controls the phase between the optical inputs to obtain a low loss output.

The optical coupler 120 has integrated feedback components to allow the coupler to be tuned for the correct optical coupling ratio between its various inputs. The optical coupler 120 is optically coupled to the fiber array 150. The fiber array 150 is a 2-dimensional array of optical output ports to be addressed by a fiber array that allows M×N connections.

Comb laser module 116 is optically coupled to fiber arrays 152, 154. An optical power monitor 140 is optically coupled to the comb laser module 116. The optical power monitor 140 may be an integrated photodiode within the SiP interposer 104, and may monitor the optical power output from a laser. By using feedback from the on-chip optical power monitor 140, the control ASIC 130 may ensure proper bias on the laser to maintain the required optical signal out of the comb laser module and can adjust the bias as necessary.

While not depicted in FIG. 1, each of the comb laser modules 110, 111, 112, 113, 114, 115, 116, 118 may each have a coupled optical power monitor allowing monitoring of the optical power output from the respective comb laser modules. All of the other comb laser modules are implied to have such an optical power monitor, but are not drawn for simplicity.

The SiP interposer 104 may have attached thereon n comb laser modules 118, or n arrays of comb laser modules, or a combination thereof. The Ln laser module 118 is optically coupled to the fiber arrays 152, 154. By using efficient couplers on the SiP interposer 104, the single output of a comb laser module may be separated among multiple outputs and routed to various fiber ports. This is shown by laser $L_n$ 118 where its output is coupled to one of the input of the fiber arrays 152, 154.

A communications port 160 is electrically coupled to the control ASIC 130. The electrical port refers to a standard electrical interface, and may be a connection of a type of RS-232, Ethernet, QSFP, or any other type that allows the circuit package 100 to electrically communicate with another system, or other devices. By using out-of-band communication either electrical or optical, the circuit package 100 may communicate with other components such as optical transmitters, compute nodes, switches, etc.

Figure 2:
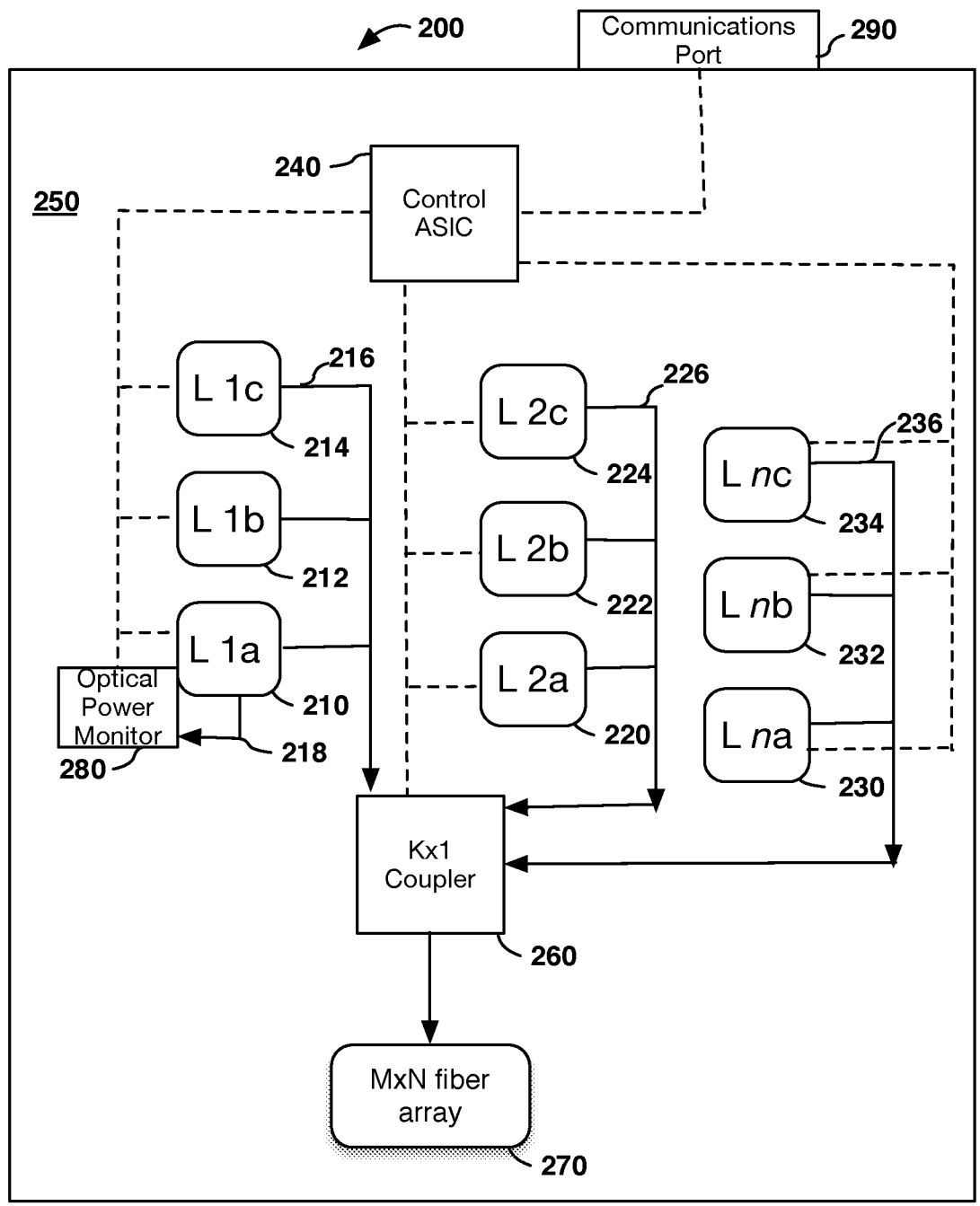
FIG. 2 is a diagram of an exemplary photonic integrated circuit package according to one example of the principles disclosed herein.

Referring now to FIG. 2, the figure depicts a schematic view of the configuration of an exemplary photonic integrated circuit package 200. The photonic integrated circuit package 200 may be constructed as a DWDM interconnect. One comb laser module in each array is used during operation of the circuit package 200. The other comb laser modules in the array serve as redundant, or back-up, comb laser modules in the array. The control circuitry monitors each of the operative comb laser modules, and can determine the actual or likely failure of a comb laser modules. Moreover, the control circuitry may periodically switch between use of any comb laser module in an array.

This configuration depicts three arrays of comb laser modules. Array one includes comb laser modules 210, 212, 214. Array two includes comb laser modules 220, 22, 224. And array three includes comb laser modules 230, 232, 234. While each array includes three comb laser modules, each array can be configured with any number of comb laser modules in the array. For redundancy purposes the array would include at least two comb laser modules in the array. The comb laser modules are bonded to a substrate 250, such as a silicon interposer.

While three arrays are show in this example, n number of arrays may be used. The number of arrays will be based on the overall bandwidth and the number of channels needed for the particular application.

Each of the comb laser module in the array have a similar spectral emission range. The spectral range of the comb laser modules in array one is different than the spectral range of emission of array two, and different from that of array three. Each array is meant to provide a particular spectral range, and each comb laser module serve as a backup to the other comb laser modules in the array.

Each of the comb laser modules in an array are optically coupled to a local waveguide. For example, comb laser modules 210, 212, 214 are optically coupled to local waveguide 216. Comb laser modules 220, 222, 224 are optically coupled to local waveguide 226. Comb laser modules 230, 232, 234 are optically coupled to local waveguide 236. The waveguides 216, 226, 236 are disposed within a substrate, such as silicon or other semiconductor based material.

Each of the waveguides 216, 226, 236 are optically coupled to an optical coupler 260. The optical coupler is optically coupled to an M×N fiber array 270.

Control circuitry 240 control various components of the photonic integrated circuit package 200. Dotted lines depicted an electrical connection between components. The control circuitry depicted in the diagram is in the form of an ASIC. The ASIC determines which comb laser modules in an array are provided. The ASIC also controls data communication, data transmission and other operations.

An optical power monitor is coupled to each comb laser module. For simplicity, only optical power monitor 280 is shown is shown in the figure. The optical power monitor 280 monitors emitted wavelength from comb laser module 210 via the local waveguide 218. The control circuitry 240 can determine whether the power output of a laser module is within an expected range based on the power input.

A communications port 290 is electrically coupled to the control ASIC 240. The electrical port refers to a standard electrical interface, and may be a connection of a type of RS-232, Ethernet, QSFP, or any other type that allows the circuit package 200 to electrically communicate with another system, or other devices. By using out-of-band communication either electrical or optical, the circuit package 200 may communicate with other components such as optical transmitters, compute nodes, switches, etc.

Figure 3:
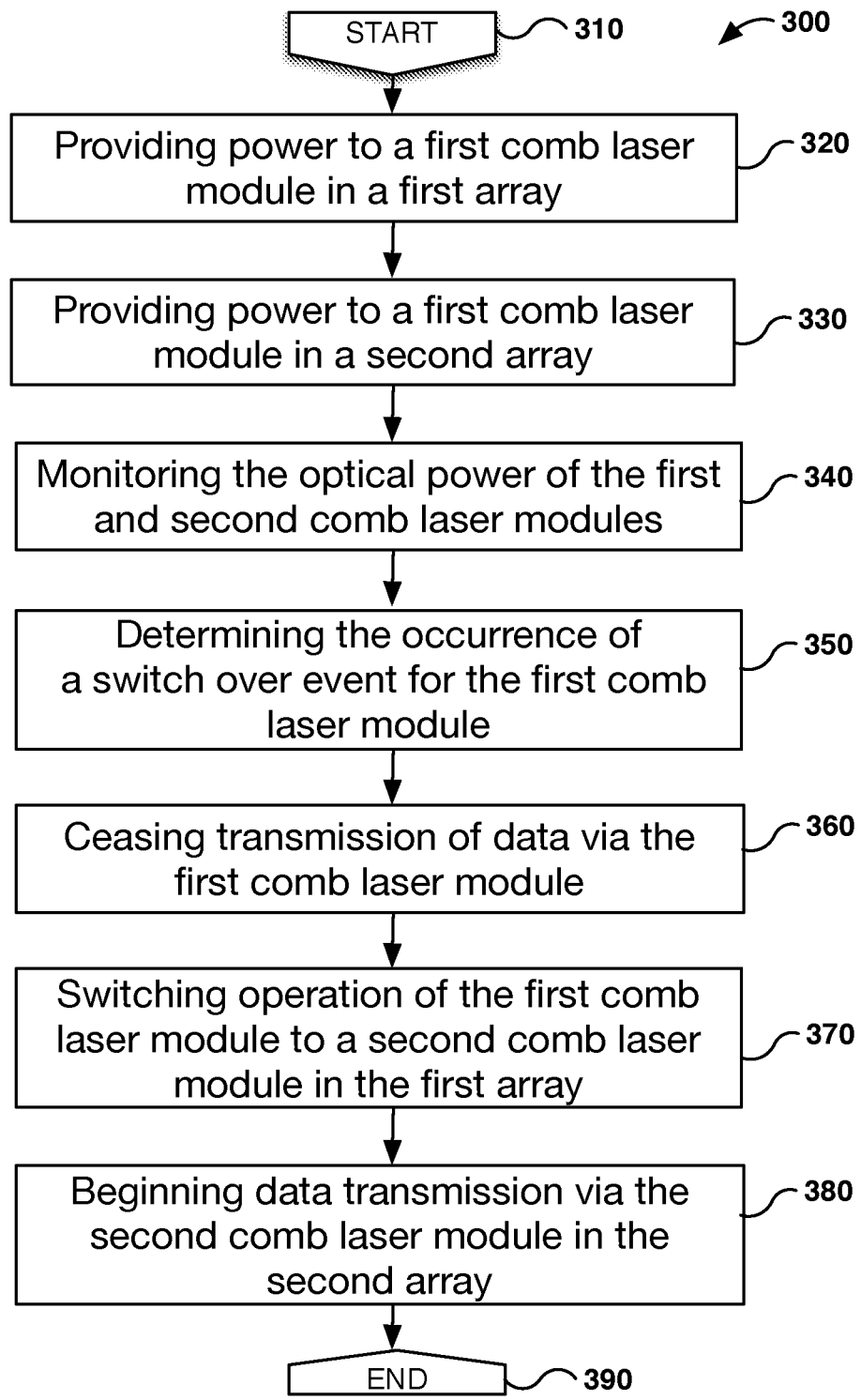
FIG. 3 is a diagram of a method flow-chart illustrating switch over from a comb laser module within an array of comb laser modules.

Referring now to FIG. 3, an exemplary process for the control and operation of the circuit package shown. The control circuitry of the circuit package provides for monitoring the health of an operating laser, and may automatically switch over to a redundant laser in a laser array for back-up due to a failed or failing comb laser module. The control circuitry, a separate processor, and/or other firmware may be used for control and/or monitoring of the comb laser modules in an array.

The process begins 310 and the control circuitry provides power to a first comb laser module in a first array 320, and provides power to a first comb laser module in a second array 330. The control circuitry may monitor the optical output power and the current of an operative comb laser module 330. The control circuitry determines whether a switch over event for one of the comb laser modules has occurred 340 and/or should occur for the operative comb laser module in the array. The control circuitry may determine that a switch over event has occurred 350. For example, the control circuitry may determine that the first comb laser module of the first array has a higher than threshold level of power input to achieve a set power output.

The control circuitry then ceases data transmission using the first comb laser module 360. The control circuitry selects another comb laser module in the array for continued operation 370. The selected comb laser module is then powered on, and the control circuitry resumes data transmission using the selected comb laser module 380. The first comb laser module may be identified as inoperative, and disabled from subsequent use by the circuit package.

During this controlled switch over, the control ASIC may adjust the laser bias to maintain required optical power, and optionally perform dynamic routing of the laser output to various inputs for adjustment of overall number of channels.

Optionally, an initial evaluation may be performed for each comb laser module in an array. The control circuitry may determine the operative characteristics of each comb laser. For example, assuming an array of three comb laser modules ($L_{1a}$, $L_{1b}$, $L_{1c}$), the control circuitry may evaluate the power output of each comb laser module in the array based on a given power input. This information may be stored in a non-volatile memory register as a hash-table for example for later use. The hash-table may include identifiers for each the comb laser modules in an array, and other information designating a preferred order of use. During this evaluation, it may be found that laser $L_{1c}$ is the most efficient laser, then $L_{1b}$, and lastly laser $L_{1a}$. The control circuitry may then designate a preferred order of use of the comb laser modules in the array, for example $L_{1c}$, $L_{1b}$ and $L_{1a}$. After this initial evaluation process has been performed, the control circuitry may selectively use laser $L_{1c}$ as the default for the primary operative laser.

In certain cases, the initial evaluation process may determine that one of the comb laser modules is defective, or not suitable for use. In this instance, the particular laser will be identified for non-use, and will not act as a backup laser module in the event of failure of another of the comb laser modules in the array.

This evaluation process may be periodically performed. Over time, constant use of a comb laser module may subject a comb laser module to thermal fluctuations which may cause the operating characteristics of the comb laser module to change over time. The required power to achieve a desired output of a primary operative laser module may increase over time. The evaluation process may determine that a comb laser module initially identified as the preferred laser module for use, may now in fact, be less desirable for use than one of the other laser modules in the array. Continuing the example with the three comb laser modules ($L_{1a}$, $L_{1b}$, $L_{1c}$), while initially comb laser module $L_{1c}$ was identified as the primary operative laser, it may be determined that now comb laser module $L_{1b}$ is now the preferred laser for use as the primary operative laser. In this case, the control circuitry, after performing the evaluation process, will designate comb laser module $L_{1b}$ as the primary operative laser. Should comb laser module $L_{1b}$ fail during normal operation, the control circuitry may select between the remaining comb laser modules in the array for continued normal operation.

The foregoing description, for purposes of explanation, used specific nomenclature to provide a thorough understanding of the disclosure. However, it will be apparent to one skilled in the art that the specific details are not required in order to practice the systems and methods described herein. The foregoing descriptions of specific examples are presented for purposes of illustration and description. They are not intended to be exhaustive of or to limit this disclosure to the precise forms described. Obviously, many modifications and variations are possible in view of the above teachings. The examples are shown and described in order to best explain the principles of this disclosure and practical applications, to thereby enable others skilled in the art to best utilize this disclosure and various examples with various modifications as are suited to the particular use contemplated. It is intended that the scope of this disclosure be defined by the claims and their equivalents below.

We claim:

1. A method for controlling a first and second array of comb laser modules disposed on a silicon interposer, the method comprising:
   providing power to a first comb laser module in the first array of comb laser modules, the comb laser modules of the first array having a common spectral output range;
   providing power to a first comb laser module in a second array of comb laser modules, the comb laser modules of the second array having a common spectral output range;
   determining a switch over event for the first array, wherein determining the switch over event for the first array comprises detecting failure of the first comb laser module in the first array by an ASIC electronically coupled to each comb laser module of the first array; and
   upon determining the switch over event, switching over via the ASIC, operation of the first comb laser module in the first array to operation of a second comb laser module in the first array.

2. The method of claim 1, wherein determining a switch over event comprises:
   monitoring the optical power for the first comb laser module; and
   detecting that the optical power for the first comb laser module is below a threshold power output value.

3. The method of claim 1, wherein switching over operation comprises:
   ceasing data transmission via the first comb laser module; and
   beginning data transmission via the second comb laser module.

4. The method of claim 1, further determining a switch over event comprises:
   receiving an instruction to switch operation to a particular comb laser module of the first array.

5. The method of claim 1, further comprising:
   determining a switch over order for each comb laser module in an array; and
   switching over to a second comb laser module in the first array based on the determined switch over order.

6. The method of claim 5, wherein determining a switch over order comprises:
   for each comb laser module in an array:
      powering on the comb laser module with a specified voltage; and
      recording a peak power of the comb laser module.

7. The method of claim 1, wherein the comb laser modules of the first array have a spectral range of emission different than a spectral range of emission of the comb laser modules of the second array.

8. The method of claim 1, wherein the first comb laser module of the first array has a spectral range bandwidth of emission of between 7 nm to 11 nm, and the first comb laser module of the second array has a spectral range bandwidth of emission of between 7 nm to 11 nm.

9. The method of claim 1, wherein a combined spectral range of the first comb laser module of the first array and the first comb laser module of the second array have a spectral range bandwidth of emission of between 14 nm to 22 nm.

10. The method of claim 1, further comprising:
    identifying the first comb laser module as inoperative; and
    disabling the first comb laser module from subsequent use.

* * * * *